(12) United States Patent
Hermann

(10) Patent No.: US 10,343,651 B2
(45) Date of Patent: Jul. 9, 2019

(54) KEYLESS ACCESS SYSTEM FOR A MOTOR VEHICLE, AND METHOD FOR LOCATING A SIGNAL GENERATOR OF THE ACCESS SYSTEM

(71) Applicant: Continental Automotive GmbH, Hannover (DE)

(72) Inventor: Stefan Hermann, Neunkirchen am Brand (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/081,099

(22) PCT Filed: Feb. 2, 2017

(86) PCT No.: PCT/EP2017/052303
§ 371 (c)(1),
(2) Date: Aug. 30, 2018

(87) PCT Pub. No.: WO2017/162359
PCT Pub. Date: Sep. 28, 2017

(65) Prior Publication Data
US 2019/0061690 A1 Feb. 28, 2019

(30) Foreign Application Priority Data
Mar. 23, 2016 (DE) .................. 10 2016 204 838

(51) Int. Cl.
*B60R 25/24* (2013.01)
*B60R 25/01* (2013.01)
(Continued)

(52) U.S. Cl.
CPC .......... *B60R 25/245* (2013.01); *B60R 25/01* (2013.01); *B60R 25/24* (2013.01); *G01S 5/02* (2013.01);
(Continued)

(58) Field of Classification Search
None
See application file for complete search history.

(56) References Cited

U.S. PATENT DOCUMENTS 9,227,595 B2 1/2016 Yang et al.
9,751,497 B2 9/2017 Sanji et al.
(Continued)

FOREIGN PATENT DOCUMENTS

DE 10212648 A1 10/2003
DE 102007003495 A1 7/2008
(Continued)

OTHER PUBLICATIONS

International Search Report and Written Opinion of the International Searching Authority for International Application No. PCT/EP2017/052303, 9 pages.
(Continued)

*Primary Examiner* — Daniell L Negron
(74) *Attorney, Agent, or Firm* — RatnerPrestia

(57) ABSTRACT

A keyless access system for a motor vehicle, which includes a portable signal generator for access to one or more doors or flaps of the motor vehicle, wherein the signal generator transmits an enable signal to a receiver unit, mounted on the motor vehicle, by a short-range radio link. The receiver unit permits access to one or more doors or flaps if it is determined that the enable signal is valid and a distance criterion which represents a distance between the signal generator and the motor vehicle is satisfied. The distance criterion results from a comparison of a weighted reception field strength of the short-range radio link between the signal generator and the receiver unit with a threshold value.

15 Claims, 1 Drawing Sheet

(51) Int. Cl.
*G01S 5/02* (2010.01)
*G07C 9/00* (2006.01)

(52) U.S. Cl.
CPC ........ *G01S 5/0226* (2013.01); *G07C 9/00174* (2013.01); *B60R 2325/10* (2013.01); *B60R 2325/101* (2013.01); *B60R 2325/205* (2013.01); *G07C 2209/63* (2013.01)

(56) References Cited

U.S. PATENT DOCUMENTS

| | | | |
|---|---|---|---|
| 10,235,823 | B1* | 3/2019 | Saleh ................ G07C 9/00309 |
| 2005/0038574 | A1 | 2/2005 | Gila et al. |
| 2011/0148569 | A1 | 6/2011 | Froitzheim |
| 2016/0150451 | A1* | 5/2016 | Barreto De Miranda Sargento .... H04W 36/14 370/332 |

FOREIGN PATENT DOCUMENTS

| | | |
|---|---|---|
| DE | 102014114823 A1 | 4/2015 |
| EP | 0570761 A1 | 11/1993 |
| EP | 2945137 A1 | 11/2015 |
| WO | 2015064020 A1 | 5/2015 |

OTHER PUBLICATIONS

German Seach Report for German Application No. 10 2016 204 838.4, dated Sep. 27, 2016 with partial translation, 7 pages.

\* cited by examiner

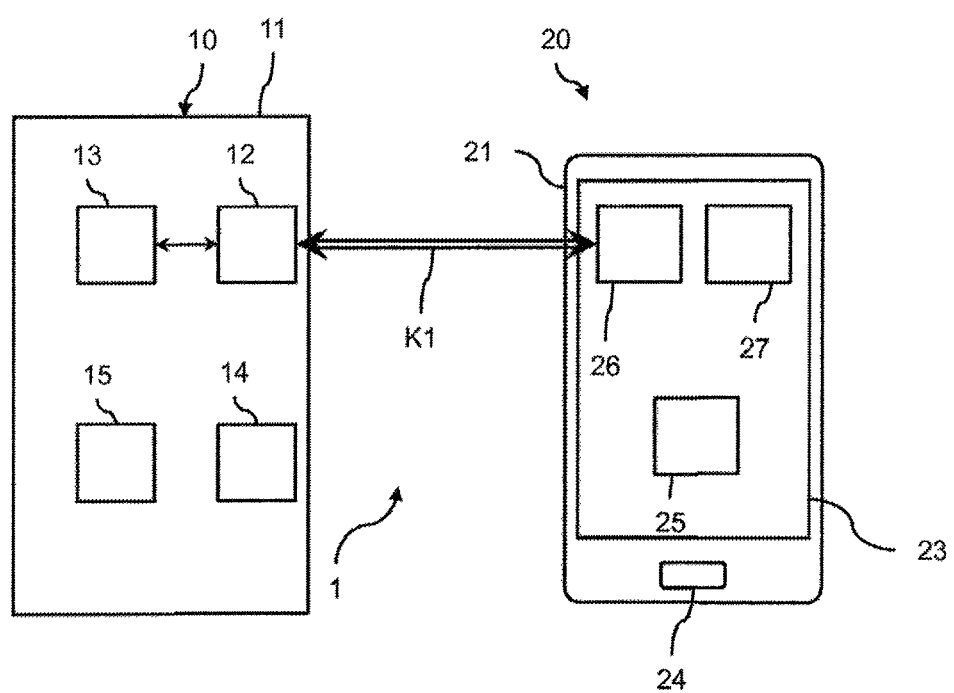

KEYLESS ACCESS SYSTEM FOR A MOTOR VEHICLE, AND METHOD FOR LOCATING A SIGNAL GENERATOR OF THE ACCESS SYSTEM

CROSS REFERENCE TO RELATED APPLICATIONS

This application is the U.S. National Phase Application of PCT International Application No. PCT/EP2017/052303, filed Feb. 2, 2017, which claims priority to German Patent Application No. 10 2016 204 838.4, filed Mar. 23, 2016, the contents of such applications being incorporated by reference herein.

FIELD OF THE INVENTION

The invention relates to a keyless access system for a motor vehicle, which comprises a portable signal generator for access to one or more doors or flaps of the motor vehicle, which signal generator transmits an enable signal to a receiver unit, mounted on the motor vehicle, by means of a short-range radio link, wherein the receiver unit permits access to one or more doors or flaps if it is determined that the enable signal is valid and a distance criterion which represents a distance between the signal generator and the motor vehicle is satisfied. The invention also relates to a method for determining the location of a portable signal generator of such a keyless access system for a motor vehicle.

BACKGROUND OF THE INVENTION

Keyless access systems are used e.g. in motor vehicles to impede the access to or entry into the vehicle of unauthorized persons, or even to entirely prevent authorized access. On the other hand, access for authorized persons is to be made as easy as possible as is the case when using conventional keys.

Document EP 0 570 761 B1, incorporated by reference herein, has disclosed a passive keyless access system. The latter comprises a portable signal generator which has a sensor for transmitting an encoded generator signal. The encoded generator signal contains a clock code with a receiver assigned to the vehicle. The receiver has an antenna for receiving the encoded generator signal when the portable signal encoder is within a specific range around the vehicle. The receiver contains control means for decoding the generator signal and activating specific functions, specifically the opening and closing of the vehicle doors.

In such keyless access systems, it is necessary for some functions to ascertain the distance of the signal generator relative to the vehicle. It is possible to carry out certain functions only when the signal generator is at less than a specific limiting distance. Such functions can be, for example, a comfort closing feature of windows and/or a sunroof of the motor vehicle using the signal generator. For reasons of safety, the limiting distance is selected such that it is ensured that the person activating the signal generator observes the vehicle.

In the case of keyless access systems which operate with an LF frequency of 125 or 130 kHz, sufficient precision during the determination of the distance of the signal generator relative to the vehicle is possible by processing a measured field strength since the LF field strength is dependent to the third power on the distance.

Since cell phones are becoming increasingly widespread, it is desirable to use them as a signal generator for a keyless access system. The passive access to the vehicle can be carried out e.g. by means of a short-range radio link, for example on the basis of the Bluetooth Standard, between the vehicle and the cell phone. Owing to the relatively high frequencies in the gigahertz range and the propagation as an electrical field, it is not possible to ascertain the distance between the cell phone as a signal generator and the vehicle with sufficient accuracy through the determination of the RF field strength (RF, RSSI—received signal strength indicator). This is due to the fact that the RF field strength is dependent to the second power on the distance.

SUMMARY OF THE INVENTION

An aspect of the invention aims to make available a functionally improved keyless access system which permits the implementation of distance-dependent functions by means of RF radio remote-control links using a signal generator which employs a short-range radio link. It is also an aspect of the invention to specify a method for determining the location of a portable signal generator of such a keyless access system.

An aspect of the invention proposes a keyless access system for a motor vehicle, which comprises a portable signal generator for access to one or more doors or flaps of the vehicle, which signal generator transmits an enable signal to a receiver unit, mounted on the motor vehicle, by means of a short-range radio link, wherein the receiver unit permits access to one or more doors or flaps if it is determined that the enable signal is valid and a distance criterion which represents a distance between the signal generator and the motor vehicle is satisfied. According to an aspect of the invention, the distance criterion results from a comparison of a weighted reception field strength of the short-range radio link between the signal generator and the receiver unit with a threshold value.

Short-range radio links are to be understood as radio links which use frequencies in a frequency range between 900 MHz and 2.5 GHz.

As a result of the weighting of the reception field strength of the short-range radio link it is possible to determine the location of the signal generator in a way which is comparable to a keyless access system which uses an LF field strength measurement. As result, the functions which are known from keyless access systems and which use LF field strengths can also be used in RF communication channels. These are e.g. the closing of windows and/or of a sunroof using the signal generator.

The portable signal generator is a mobile terminal. The mobile terminal is, in particular, a mobile radio terminal such as e.g. a smart phone. Such a mobile terminal is capable not only of communicating with the receiver unit of the motor vehicle but, furthermore, of also performing a location-determining process which can be used to determine the distance criterion. Therefore, any mobile terminal which has, on the one hand, an interface for the short-range radio link to the receiver unit of the motor vehicle and, on the other hand, is able to carry out a position-determining process can be used as the signal generator.

In one refinement there is provision that the reception field strength of a signal which is emitted by the signal generator can be ascertained by the receiver unit. The reception field strength is also referred to as the "received signal strength indicator" (RSSI) which constitutes an indicator of the reception field strength of cableless communication applications. The determination of the reception field strength is known from cell phones, wherein this indicator is used to find a channel which can be used for communication. Since the measurement of the reception field strength is known to the person skilled in the art from the prior art, a detailed description of the ascertaining process will not be given in this description. In the keyless access system here, the reception field strength is, as described, ascertained by the receiver unit.

The reception field strength is expediently weighted with a distance value, i.e. an ascertained distance, between the signal generator and the motor vehicle. The distance value can be calculated from first position data of the signal generator and second position data of the vehicle, wherein the first and second position data are based on transit time differences between signals from a plurality of satellites to a respective GNSS (Global Navigation Satellite System) receiver. As is known to person skilled in the art, use is made of the fact that differences in distance are proportional to the time differences. In practice, inaccuracies arise here because the speed of the signals to the satellites varies slightly chronologically and spatially. In addition, the path errors and clock errors of the satellites are not exactly known to the receiver. However, the influence of these effects can be measured with the same degree of accuracy by receivers in the immediate vicinity, i.e. the vehicle and the signal generator, with the result that the difference in position can be measured more accurately. Precise determination of the distance value is therefore also possible.

In a first refinement, the signal generator can comprise a GNSS receiver, by which the first position data and the second position data can be determined at different times. Therefore, for example the position of the vehicle can be stored for later use by measuring the signal generator when the engine is switched off. The position of the signal generator can then be ascertained at a different time if a specific function of the keyless access system, whose execution requires knowledge of the distance, is to be activated using the signal generator. The distance value can then be determined by combining the previously measured position data of the vehicle with the first position data of the signal generator. This refinement permits the distance value to be ascertained even if the vehicle does not have its own GNSS receiver or the latter is temporarily not functionally capable, for example owing to unfavorable circumstances such as e.g. parking in a multi-story car park.

In an alternative refinement there is provision that the signal generator comprises a GNSS receiver, by which the first position data of the signal generator can be determined, and the motor vehicle comprises a GNSS receiver, by which the second position data of the motor vehicle can be determined. In this refinement, the position data are acquired both by the vehicle and by the signal generator by means of different GNSS receivers.

By virtue of this procedure, the accuracy of the position-determining process and therefore the determination of the distance value is ensured, since, similarly to a differential global positioning system (DGPS), measuring errors are eliminated owing to the short distance between the motor vehicle and the signal generator. The accuracy of the position-acquisition process and therefore of the acquisition of the distance value is therefore provided by the signal generator and the position-determining process which it carries out.

The distance value can be acquired, for example, by means of a computer unit of the vehicle, wherein it is necessary for this for the signal generator to transmit the position data acquired by it to the motor vehicle for evaluation.

The weighted reception field strength can be the measured reception field strength divided by the distance value. If the measured reception field strength is the RSSI, the weighted reception field strength is $RSSI_{weighted}$=RSSI/distance value.

If the measured reception field strength RSSI is a logarithmic representation of the field strength, the weighted reception field strength $RSSI_{weighted}$ is the measured reception field strength RSSI minus the logarithm of the distance value $\log_{10}$(distance value), i.e. $RSSI_{weighted}$=RSSI-$\log_{10}$(distance value).

As result of the comparison with the distance value, the distance criterion is obtained as a binary variable. The distance criterion therefore merely makes a statement as to whether the distance is short enough for a specific function of the keyless access system to be carried out, i.e. to be executed, or not. This method does not provide an absolute distance.

According to a further expedient refinement, the receiver unit and the signal generator comprise communication interfaces according to the Bluetooth Standard 802.15, wherein the communication between the receiver unit and the portable signal generator takes place via these communication interfaces. The use of Bluetooth is preferred since it is widespread in signal generators which are configured as mobile terminals. However, in principle any short-range radio standards can also be used.

An aspect of the invention also proposes a method for determining the location of a portable signal generator of a keyless access system for a motor vehicle, wherein the portable signal generator serves for the access to one or more doors or flaps of the vehicle. In the method, a reception field strength of a signal, emitted by the portable signal generator, over a short-range radio link is measured by a receiver unit mounted on the motor vehicle. The measured reception field strength is weighted. A distance criterion is acquired from a comparison of the weighted reception field strength of the short-range radio link between the signal generator and the receiver unit with a threshold value.

The reception field strength is weighted, in particular, with a distance value between the signal generator and the motor vehicle.

In particular, the distance value is calculated from first position data of the signal generator and second position data of the vehicle, wherein the first and second position data are based on transit time differences between signals from a plurality of satellites to a respective GNSS receiver.

BRIEF DESCRIPTION OF THE DRAWING

An aspect of the invention is explained in greater detail below on the basis of an exemplary embodiment in the drawing. The FIGURE shows a schematic illustration of an exemplary embodiment of a keyless access system according to an aspect of the invention.

DETAILED DESCRIPTION OF THE PREFERRED EMBODIMENTS

The FIGURE shows a keyless access system 1 according to an aspect of the invention. The access system 1 serves to access one or more doors or flaps (not illustrated in more detail in the FIGURE) or to start a motor vehicle 10 (not illustrated in detail). Furthermore, the keyless access system 1 comprises a portable signal generator 20 which is present in the form of a mobile terminal 21. The mobile terminal 21 can be, for example, a mobile radio terminal such as e.g. a smart phone. The latter comprises, in a way which is typical for smartphones, for example a display 23 and an input means 24 in the form of one or more keypads. Furthermore, any other mobile electronic device can also be used as a mobile terminal 21 provided that the latter has the interfaces and properties described below.

The mobile terminal 21 has a communication interface 26 which is designed to transmit data over a short range. The communication interface 26 can be embodied, for example, as a Bluetooth interface. Furthermore, the mobile radio terminal has a GNSS receiver 25, which can be used by the mobile terminal to carry out a position-determining process on the basis of transit time differences between the signals from a plurality of satellites. As is known to the person skilled in the art, and will therefore not be explained in more detail, the position-determining process requires differences in distance to be proportional to the time differences.

Assuming that the mobile terminal 21 is a mobile radio terminal, the latter also comprises a further communication interface 27, e.g. on the basis of the known GSM or UMTS standard. However, since this communication interface 27 is not significant for the present invention, more details are not given on this or on further functions of the mobile radio terminal.

The motor vehicle 10 (not illustrated in more detail) has a receiver unit 11 with a communication interface 12 for short-range communication (e.g. Bluetooth) as well as a computer unit 13 which is connected to the communication interface 12 and has the purpose of processing the signals received by the communication interface 12 as well as of making available signals which are to be emitted via the communication interface 12. The receiver unit 11 is, for example, a transceiver. In addition, the receiver unit has a means for determining the reception field strength 14 of a signal which is emitted by the mobile terminal 21. Furthermore, the vehicle 10 has an optional GNSS receiver.

The communication between the communication interface 12 of the receiver unit 11 and the communication interface 26 of the mobile terminal 21 takes place via the communication path K1 via the short-range radio link, preferably Bluetooth.

In order to determine the location of the mobile terminal 21, the RF field strength (RSSI) of the signal emitted by the mobile terminal 21 is measured by the means 14. In addition, a distance value, i.e. a distance between the mobile terminal 21 and the motor vehicle 10, is determined. This can be done by determining and setting off the positions of the respective GNSS receiver 15 of the motor vehicle 10 and of the respective GNSS receiver 25 of the mobile terminal 21 against one another. Since the position-determining process using a plurality of satellites is known from the prior art, it will not be explained in more detail here. The position which is ascertained by the mobile terminal 21 can be transmitted to the receiver unit 11 via the communication path K1 in order to determine the distance value.

If the motor vehicle 10 does not have a GNSS receiver 15, the determination of the position of the motor vehicle 10 can also be performed using the mobile terminal 11. For this purpose, a position-determining process takes place, e.g. when the engine of the motor vehicle is switched off, wherein the position ascertained at this time is stored for later use. During this procedure, it is assumed that the mobile terminal 21 is located in the motor vehicle 10 at the time when the engine of the motor vehicle 20 switched off, and therefore corresponds to the position of the motor vehicle 10. At a later time, when the distance value between the motor vehicle 10 and the mobile terminal 21 is to be ascertained, the mobile terminal 21 determines its position and the position value is transmitted to the receiver unit 12 of the motor vehicle 10 via the communication path K1.

In order to determine the location of the mobile terminal 21, the measured field strength RSSI is weighted with the distance value (i.e. the distance between the motor vehicle 10 and the mobile terminal 21). The weighting can occur, for example, as follows: $RSSI_{weighted}$=RSSI/distance value. If the measured RF field strength RSSI is a logarithmic representation of the field strength, $RSSI_{weighted}$=RSSI-$\log_{10}$ (distance value) can be used as the weighted field strength.

Subsequently, the weighted field strength $RSSI_{weighted}$ is used for qualitative determination of distance. For this purpose, for example comparison is made with a threshold value which has been defined previously, e.g. by means of tests. The result of this comparison is of merely binary nature, i.e. there is information available as to whether the determined position of the mobile terminal lies within a distance limiting value or not. Only in the former case can a signal which is transmitted to the motor vehicle by the mobile terminal bring about the execution of a specific function, e.g. the closing of a window or sunroof of the motor vehicle 10.

As a result of the weighting of the measured RF field strength it is possible to use the functionalities which are known from conventional keyless access systems, wherein conventional keyless access systems are understood to be access systems which use LF frequencies within the scope of their communication.

As a result of the described procedure for ascertaining the distance value, the accuracy of the GNSS measurement is also taken into account in the method. The ascertained position of the vehicle and the distance of the mobile terminal from the vehicle can also be used for further functions such as e.g. searching for a vehicle.

LIST OF REFERENCE SIGNS

1 Keyless access system
10 Motor vehicle
11 Receiver unit
12 Communication interface (e.g. Bluetooth)
13 Computer unit
14 Means for measuring the reception field strength
15 GNSS receiver
20 Portable signal generator
21 Transmitter unit (mobile radio terminal)
23 Display
24 Input means
25 GNSS receiver
26 Communication interface (e.g. Bluetooth)
27 Communication interface

The invention claimed is:
1. A keyless access system for a motor vehicle, comprising:
    a portable signal generator for access to one or more doors or flaps of the motor vehicle, which signal generator transmits an enable signal to a receiver unit, mounted on the motor vehicle, by a short-range radio link, wherein the receiver unit permits access to one or more doors or flaps if it is determined that the enable signal is valid and a distance criterion which represents a distance between the signal generator and the motor vehicle is satisfied, wherein the distance criterion results from a comparison of a weighted reception field strength of the short-range radio link between the signal generator and the receiver unit with a threshold value, wherein the reception field strength is weighted with a distance value between the signal generator and the motor vehicle, and wherein the distance value is calculated from first position data of the signal generator and second position data of the motor vehicle, wherein the first and the second position data are based on transit time differences between signals from a plurality of satellites to a respective GNSS receiver.

2. The keyless access system as claimed in claim 1, wherein the reception field strength of a signal which is emitted by the signal generator is ascertained by the receiver unit.

3. The keyless access system as claimed in claim 2, wherein the weighted reception field strength is the measured reception field strength divided by the distance value.

4. The keyless access system as claimed in claim 2, wherein, if the measured reception field strength is a logarithmic representation of the field strength, the weighted reception field strength is the measured reception field strength minus the logarithm of the distance value.

5. The keyless access system as claimed in claim 1, wherein the signal generator comprises a GNSS receiver, by which the first position data and the second position data is determined, in particular at different times.

6. The keyless access system as claimed in claim 5, wherein the weighted reception field strength is the measured reception field strength divided by the distance value.

7. The keyless access system as claimed in claim 5, wherein, if the measured reception field strength is a logarithmic representation of the field strength, the weighted reception field strength is the measured reception field strength minus the logarithm of the distance value.

8. The keyless access system as claimed in claim 1, wherein the signal generator comprises a GNSS receiver, by which the first position data of the signal generator is determined, and the motor vehicle comprises a GNSS receiver, by which the second position data of the motor vehicle is determined.

9. The keyless access system as claimed in claim 8, wherein the weighted reception field strength is the measured reception field strength divided by the distance value.

10. The keyless access system as claimed in claim 8, wherein, if the measured reception field strength is a logarithmic representation of the field strength, the weighted reception field strength is the measured reception field strength minus the logarithm of the distance value.

11. The keyless access system as claimed in claim 1, wherein the weighted reception field strength is the measured reception field strength divided by the distance value.

12. The keyless access system as claimed in claim 1, wherein, if the measured reception field strength is a logarithmic representation of the field strength, the weighted reception field strength is the measured reception field strength minus the logarithm of the distance value.

13. The keyless access system as claimed in claim 1, wherein the distance criterion is a binary variable.

14. The keyless access system as claimed in claim 1, wherein the receiver unit and the signal generator comprise communication interfaces according to the Bluetooth Standard 802.15, wherein the communication between the receiver unit and the portable signal generator takes place via these communication interfaces.

15. A method for determining the location of a portable signal generator of a keyless access system for a motor vehicle, wherein the portable signal generator serves for the access to one or more doors or flaps of the motor vehicle, comprising:
measuring a reception field strength of a signal, emitted by the portable signal generator, over a short-range radio link by a receiver unit mounted on the motor vehicle;
weighing the measured reception field strength;
acquiring a distance criterion from a comparison of the weighted reception field strength of the short-range radio link between the signal generator and the receiver unit with a threshold value, in which the reception field strength is weighted with a distance value between the signal generator and the motor vehicle, and in which the distance value is calculated from first position data of the signal generator and second position data of the motor vehicle, wherein the first and second position data are based on transit time differences between signals from a plurality of satellites to a respective GNSS receiver.

* * * * *